United States Patent
Gruhl et al.

(10) Patent No.: US 8,595,188 B2
(45) Date of Patent: Nov. 26, 2013

(54) OPERATING SYSTEM AND FILE SYSTEM INDEPENDENT INCREMENTAL DATA BACKUP

(75) Inventors: Daniel Gruhl, San Jose, CA (US); Jan H. Pieper, San Jose, CA (US); Mark Andrew Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 12/614,134

(22) Filed: Nov. 6, 2009

(65) Prior Publication Data

US 2011/0113012 A1 May 12, 2011

(51) Int. Cl.
G06F 17/30 (2006.01)
(52) U.S. Cl.
USPC .................... 707/646; 711/154; 711/162
(58) Field of Classification Search
USPC ......... 707/624, 625, 640, 641, 643, 644, 646, 707/647, 648, 649; 711/154, 162
See application file for complete search history.

(56) References Cited

U.S. PATENT DOCUMENTS

| | | | | |
|---|---|---|---|---|
| 6,029,166 | A * | 2/2000 | Mutalik et al. ................... | 1/1 |
| 6,038,379 | A * | 3/2000 | Fletcher et al. ................ | 709/230 |
| 6,161,111 | A * | 12/2000 | Mutalik et al. ................. | 707/823 |
| 6,714,952 | B2 * | 3/2004 | Dunham et al. ............... | 707/645 |
| 7,039,662 | B2 * | 5/2006 | Kano et al. ..................... | 1/1 |
| 7,266,574 | B1 * | 9/2007 | Boudrie et al. ................ | 707/646 |
| 7,272,619 | B1 * | 9/2007 | Lanzatella et al. ............ | 1/1 |
| 7,370,164 | B1 | 5/2008 | Nagarkar et al. | |
| 7,430,647 | B2 * | 9/2008 | Sandorfi et al. ................ | 711/162 |
| 7,454,443 | B2 | 11/2008 | Ram et al. | |
| 7,472,242 | B1 | 12/2008 | Deshmukh et al. | |
| 7,734,594 | B2 * | 6/2010 | Wang .............................. | 707/644 |
| 7,827,146 | B1 * | 11/2010 | De Landstheer et al. ..... | 707/651 |
| 2004/0078641 | A1 * | 4/2004 | Fleischmann ...................... | 714/6 |
| 2005/0246510 | A1 | 11/2005 | Retnamma et al. | |
| 2007/0208783 | A1 | 9/2007 | Midgley et al. | |
| 2008/0013365 | A1 | 1/2008 | Yueh | |
| 2008/0222376 | A1 * | 9/2008 | Burton et al. .................. | 711/162 |
| 2010/0070475 | A1 * | 3/2010 | Chen .............................. | 707/640 |
| 2010/0191774 | A1 * | 7/2010 | Mason et al. .................. | 707/797 |
| 2010/0274981 | A1 * | 10/2010 | Ichikawa ....................... | 711/162 |
| 2010/0306177 | A1 * | 12/2010 | Khosravi et al. .............. | 707/674 |

OTHER PUBLICATIONS

Koopmans, Marcel "[OpenAFS] byte-level incremental backups using full+reverse delta", https://lists.openafs.org/pipermail/openafs-info/2008-February/028576.html, marcel.koopmans@dsv.com Fri, Feb. 8, 2008 07:52:08 +0100.*

(Continued)

*Primary Examiner* — Jean M Corrielus
*Assistant Examiner* — Evan Aspinwall
(74) *Attorney, Agent, or Firm* — Mohammed Kashef

(57) ABSTRACT

Embodiments of the invention relate to creating an operating system and file system independent incremental data backup. A first data backup of a source system and second version of the data on the source system is received. A second data backup of the second version of the data is created by determining differences between the first data backup and the second version of the data. Each portion of the second version of the data that is the same as a portion of the first data backup is referenced in the second data backup. Each portion of the second version of the data that is different than all portions of the first data backup is included in the second data backup. The second data backup is appended to the first data backup to create an incremental data backup.

19 Claims, 5 Drawing Sheets

(56) References Cited

OTHER PUBLICATIONS

Zhu et al., "Avoiding the Disk Bottleneck in the Data Domain Deduplication File System", USENIX Conference on File and Storage Technologies, FAST '08: 6TH, pp. 269-282.

Data domain SISL, scalability architecture, Technical report, May 2007.

Tridgell, J.M. Andrew, xdelta, http://xdelta.org/, 2008, printed Oct. 30, 2009.

Barham P. et al., "Xen and the Art of Virtualization", Proceedings of the nineteenth ACM symposium on Operating systems principles, pp. 164-177, New York, 2003, ACM Press.

Clark, B. et al., "Xen and the Art of Repeated Research", USENIX Annual Technical Conference, FREENIX Track, pp. 135-144, USENIX, 2004.

Gilmore, J., "Tar-GNU Project-Free Software Foundation(FSF)", http://www.gnu.org/software/tar/, 2008, printed Oct. 30, 2009.

Hitz, D. et al., "File System Design for an NFS File Server Appliance", 1994 Winter USENIX, pp. 235-246, 1994.

Gailly J. and Adler, M., "The GZIP home page", http://gzip.org/, 2004, printed Oct. 30, 2009.

Kolivas, C., "Long Range ZIP or Lzma RZIP", http://ck.kolivas.org/apps/lrzip/README.2008, printed Oct. 30, 2009.

Kulkarni, P. et al., "Redundancy Elimination Within Large Collections of Files", In USENIX Annual Technical Conference, pp. 59-72, 2004.

Alvarez, C., "NetApp Deduplication for FAS and V-Series Deployment and Implementation Guide", Mar. 2009, TR-3505-0309.

Park, K. et al., "Supporting Practical Content-Addressable Caching with CZIP Compression", in USENIX Annual Technical Conference, pp. 185-198, 2007.

Policroniades, C. et al., "Alternatives for Detecting Redundancy in Storage Systems Data", Proceedings of the USENIX Annual Technical Conference, pp. 73-86, 2004.

Primmer, R. et al., "Collision and Preimage Resistance of the Centera Content Address", EMC Corporation Technical Report, Jun. 2005.

Quinlan, S. et al., "Venti: a new approach to archival storage", FAST 2002 Conference on File and Storage Technologies, pp. 89-102, 2002.

Rabin, M., "Fingerprinting by Random Polynomials", Technical Report TR-15-81, 1981.

Reed, B. et al., "Security Considerations When Designing a Distributed File System Using Object Storage Devices", IEEE Security in Storage Workshop, pp. 24-34, 2002.

Rosenblum, M. et al., "Virtual Machine Monitors: Current Technology and Future Trends", Computer, 38(5):39-47, 2005.

Seward, J., "bzip2 and libbzip2", http://www.bzip.org/, 2007, printed Nov. 2, 2009.

Smith, J.E. et al., "The Architecture of Virtual Machines", Computer, 38(5):32-38, 2005.

Sugerman, J. et al., "Virtualizing I/O Devices on VMware Workstation's Hosted Virtual Machine Monitor", USENIX Annual Technical Conference, General Track, pp. 1-14, 2001.

Tang, J.C. et al., "Exploring Patterns of Social Commonality Among File Directories at Work", Proceedings of the SIGCHI conference, pp. 951-960, 2007, ACM.

Tridgell, A., "Efficient Algorithms for Sorting and Synchronization", PhD Thesis, The Australian National University, Feb. 1999.

Tridgell, A., "rzip", http://rzip.samba.org/, 2004, printed Nov. 2, 2009.

Villanueva, B. et al., "Providing Students 24/7 Virtual Access and Hands-On Training using VMware GSX Server", Proceedings of ACM SIGUCCS Conference, pp. 421-425, 2005.

Waldspurger, C.A., "Memory Resource Management in VMware ESX Server", USENIX Association, Proceedings of 5th Symposium on Operating Systems Design, pp. 181-194, 2002.

Whitaker, A. et al., "Rethinking the Design of Virtual Machine Monitors", Computer, 38(5):57-62, 2005.

You, L. et al., "Evaluation of Efficient Archival Storage Techniques", 21st IEEE/12th NASA Goddard Conference on Mass Storage Systems and Technologies, pp. 227-232, 2004.

You, L. et al., "Deep Store: An Archival Storage System Architecture", 21st International Conference on Data Engineering (ICDE'05), pp. 804-815, 2005.

\* cited by examiner

| | Hash | Offset-Length | |
|---|---|---|---|
| 382 — | 0 x AF | 8,12 | — 384 |
| 386 — | 0 x 20 | 20,11 | — 388 |
| 390 — | 0 x B2 | 31,11 | — 392 |
| 394 — | 0 x 48 | 42,4 | — 396 |
| 398 — | 0 x 79 | 76,10 | — 399 |

OPERATING SYSTEM AND FILE SYSTEM INDEPENDENT INCREMENTAL DATA BACKUP

BACKGROUND

1. Field of the Invention

Embodiments of the invention relate to the field of data storage, and in particular, systems and methods for creating an operating system and file system independent incremental data backup.

2. Background of the Invention

Data is typically stored on computing systems and/or attached storage devices. The data may include operating system data, file system data, and application data. Data may be lost due to system failure or human error. Frequently, a backup copy of data is made to enable a data restore from the backup copy if the primary copy data is lost, corrupted or becomes inconsistent.

In a typical data backup architecture, a backup client obtains data that is to be backed up, and sends the data to a backup server. The backup server then stores the data on a storage device, such as a hard disk drive or tape. The backup client can restore data upon the occurrence of data loss or system failure with a backup copy of the data. When retrieving the backup copy of the data, the backup server obtains the data from the storage device and sends the data to the backup client. The data is returned to a prior satisfactory state upon completion of a successful data restore. The backup client may perform a full data backup which copies entire contents of a system to be backed up. A backup client may subsequently perform an incremental data backup which copies all data updated since a previous backup.

Traditional incremental backup clients detect changes to the file system by either comparing file metadata and file content checksums, or by utilizing operating system facilities that provide logs of file system modifications. Therefore, backup clients are developed for a specific operating system or file system. These backup clients also need to be installed and run from within the user's operating system, requiring user interaction. As backup solutions evolve, aging operating systems may no longer be supported. Further, current backup systems copy entire virtual machines images, commonly stored as single large files, even if only small portions of the data was modified.

BRIEF SUMMARY

Embodiments of the invention relate to creating an operating system and file system independent incremental data backup. An aspect of the invention includes a method for creating an operating system and file system independent incremental data backup. A first data backup of a source system and a second version of the data on the source system are received A second data backup of the second version of the data is created by determining differences between the first data backup and the second version of the data. Each portion of the second version of the data that is the same as a portion of the first data backup is referenced in the second data backup. Each portion of the second version of the data that is different than all portions of the first data backup is included in the second data backup. The second data backup is appended to the first data backup to create an incremental data backup.

Another aspect of the invention includes a computer program product for creating an operating system and file system independent incremental data backup. The computer program product includes a computer readable storage medium having computer readable program code embodied therewith. The computer readable program code includes computer readable program code configured to receive a first data backup of a source system and second version of the data on the source system. The computer readable program code further includes computer readable program code configured to create a second data backup of the second version of the data by determining differences between the first data backup and the second version of the data. Each portion of the second version of the data that is the same as a portion of the first data backup is referenced in the second data backup. Each portion of the second version of the data that is different than all portions of the first data backup is included in the second data backup. The second data backup is appended to the first data backup to create an incremental data backup.

Another aspect of the invention includes a system for creating an operating system and file system independent incremental data backup. The system includes a storage subsystem coupled to a source system. The system further includes a backup system including a receiving module coupled to the storage subsystem and configured to receive a first data backup of a source system and second version of the data on the source system. The backup system further includes a creation module coupled to the receiving module and configured to create a second data backup of the second version of the data by determining differences between the first data backup and the second version of the data. Each portion of the second version of the data that is the same as a portion of the first data backup is referenced in the second data backup. Each portion of the second version of the data that is different than all portions of the first data backup is included in the second data backup. The second data backup is appended to the first data backup to create an incremental data backup.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which:

FIG. 3B illustrates a hash table for storing data chunk signatures and referencing previously stored data chunks, according to one embodiment.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. For example, while the following description will be described in terms of backup/archive processes and devices for clarity and to place the invention in context, it should be kept in mind that the teachings herein may have broad application to all types of systems, devices and applications.

Embodiments of the invention relate to creating an operating system and file system independent incremental data backup. In creating an incremental data backup, a backup system is provided with byte level access to a source system's storage and receives data stored as a byte stream. The backup system does not have knowledge of how the data is encoded and stored within a block device because data stream does not provide information about directory structure or individual files. The byte stream is a verbatim binary copy of the storage device, which can be obtained without knowledge of the file system or operating system.

The byte stream is partitioned into data chunks and a content signature is computed for each data chunk. The backup system checks a hash table for the existence of each signature. Each data chunk with a unique signature is stored in a data backup. Reconstruction metadata is also stored in the data backup to provide a description of how to assemble data chunks stored in the data backup into an original data stream.

The backup system receives a second byte stream to create an incremental data backup. The backup system partitions the second byte stream into data chunks, and creates a signature for each data chunk. The backup system checks a hash table for the existence of each signature. Each data chunk with a unique signature is appended to the data backup to create the incremental data backup. Reconstruction metadata is appended to the data backup to provide a description of how to assemble the incremental data backup in the original data stream.

Figure 1:
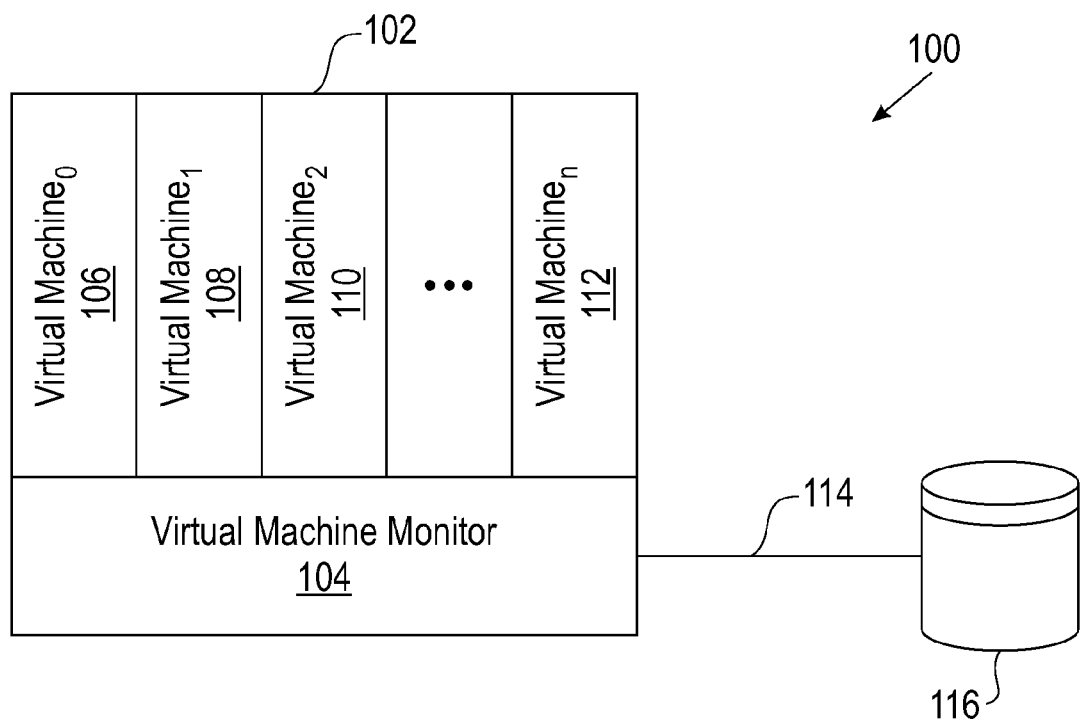
FIG. 1 illustrates a system for creating an operating system and file system independent incremental data backup, according to one embodiment.

FIG. 1 illustrates a system 100 for creating an operating system and file system independent incremental data backup, according to one embodiment. The system 100 includes virtual machine hardware 102 configured to share physical machine resources between different virtual machines 106-112, each running its own operating system. The system 100 further includes a virtual machine monitor 104, also known as a hypervisor. In one embodiment, the virtual machine monitor 104 is a host program configured to run on base hardware or on top of an operating system and manage each virtual machine within the virtual machine hardware 102.

The system 100 includes network connection 114 configured to couple the virtual machine hardware 102 to a storage subsystem 116. For example, network connections include, but are not limited to, a local area network (LAN), a wide area network (WAN), or a fibre channel (FC) network. For example, storage subsystems 116 may include, but are not limited to, a direct-attached storage (DAS) device, a locally attached physical storage, a network attached storage device (NAS), and a storage area network (SAN). In one embodiment, the storage subsystem 116 is configured to store data of a running source system.

The system 100 includes a backup system (not illustrated). The backup system is embodied in software and may run from the virtual machine monitor 104, from any of the virtual machines 106—112 running on virtual machine hardware 102, or from a standalone node, according to embodiments of the invention. The backup system is a generic backup client that does not have any knowledge of a source system's operating system and storage file system to be backed up. The backup system includes a receiving module coupled to the storage subsystem 116 configured to receive data from source system's storage subsystem 116. The backup system further includes a creation module coupled to the receiving module and configured to backup data of a source system and create incremental data backups. The source system may include any of the plurality of virtual machines on virtual machine hardware 102 or any standalone computing node, according to embodiments of the invention.

Figure 2:
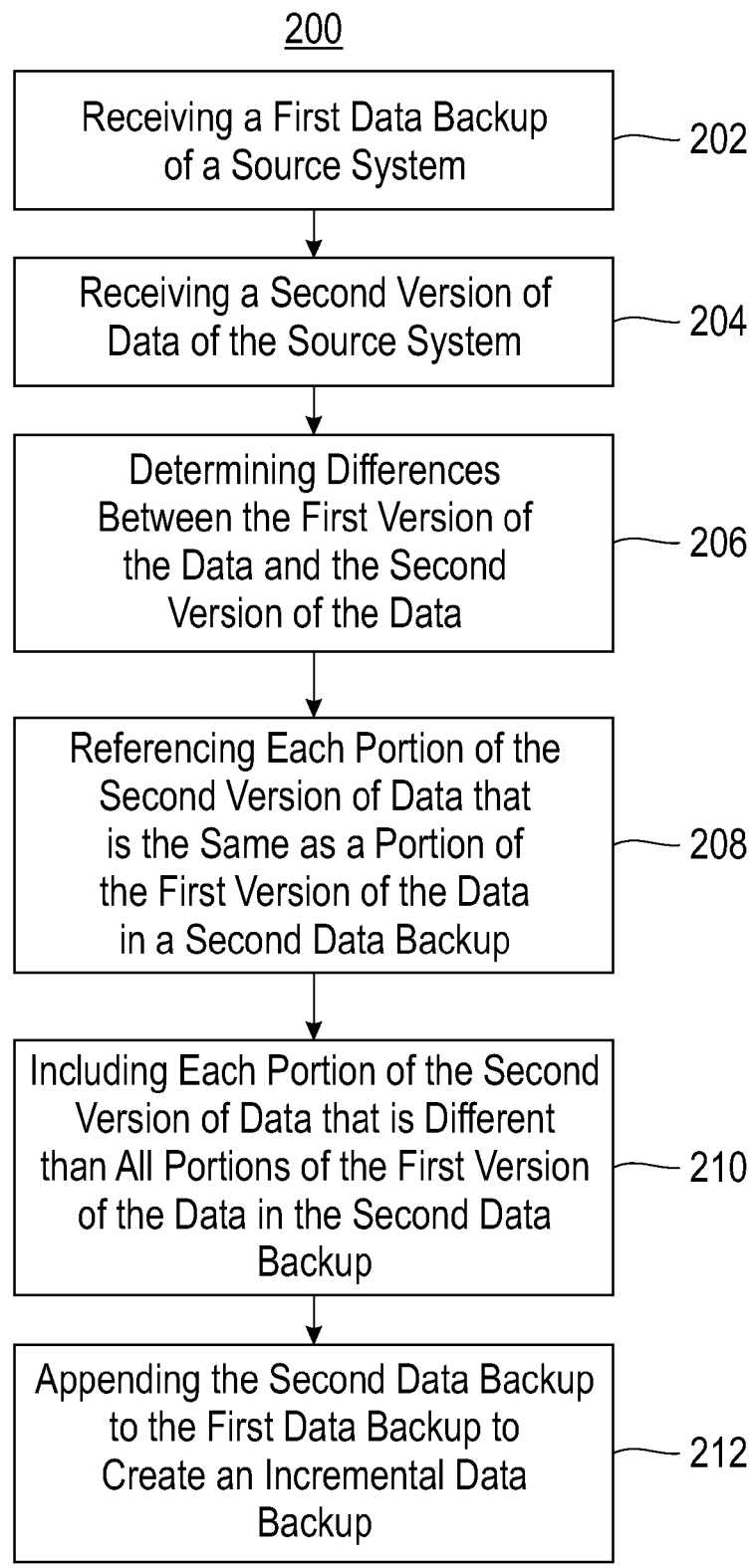
FIG. 2 illustrates a flow chart of a method for creating an operating system and file system independent incremental data backup, according to one embodiment.

FIG. 2 illustrates a flow chart of a method for creating an operating system and file system independent incremental data backup, according to one embodiment. At 202, the receiving module receives a first data backup of a source system. The first full data backup of the source system is created prior to being received by the backup system.

The backup system is given byte level access to the source system storage subsystem 116 to create the first data backup. The source system is in a quiescent state, according to one embodiment. The backup system is provided with byte level access to a point-in-time copy, also known as a snapshot, which is a disk image file of a source system's storage subsystem 116, according to another embodiment. The backup system treats the source system's data as a byte stream to remove any dependencies on the source system's operating system and file system. For example, the backup system does not require backup clients to be installed on the source system or require any end user action.

The backup system processes the byte stream from the source system's storage subsystem 116 to be backed up. The backup system treats the backup data set as a byte stream which can be created by performing a full scan of the source system's storage subsystem 116 (e.g. using UNIX dd utility) or by streaming a virtual machine image, according to an embodiment of the invention. The byte stream includes all data of a source system, including system files, application files, and other data.

The byte stream is partitioned into multiple data chunks. In one embodiment, data deduplication segments a data stream into small data chunks (in the order of kilobytes). The byte stream may be partitioned using any known data chunking method, including fixed size chunking, content-aware chunking, and content-agnostic chunking. Fixed-size chunking breaks data into chunks of a specific size, wherein the resulting chunk size may be selected to optimally align with the physical block size of the underlying storage device to maximize storage utilization. Content-aware chunking and content-agnostic chunking are variable size chunking methods.

Content-aware chunking is a variable size chunking method that generates chunks by parsing the input files and understanding their formats. Chunk boundaries may be custom generated for the highest probability of redundancy. For example, boundaries may be created between words.

Content-agnostic chunking uses the content to determine chunk boundaries, without knowledge of the content's format. Content-agnostic chunking considers the features of the byte stream sequence to deterministically identify boundaries. Chunk boundaries are identified by generating a rolling hash over a window of the byte stream being received (e.g. using Rabin fingerprinting to produce variable sizes of approximately 2 KB each). Each hash is masked and the resulting value is placed through a modulus operation. If the result of the modulus is zero, then a chunk boundary is created. The modulus value determines the frequency of chunk generation. A modulus of 16, for example, would produce an average chunk size of 16 bytes.

A data chunk signature is computed for each of the partitioned data chunks. The data chunk signature can be computed by calculating a content hash value using any known hashing function, including message-digest algorithm 5 (md5) and secure hash algorithm 1 (sha-1) hashing, according to embodiments of the invention. A data structure is used for storing each data chunk signature generated, including but not limited to, a hash table, index, and a look up table. The backup system includes data deduplication functionality and checks the hash table for the existence of each signature value computed to determine whether any of the corresponding data chunks have been previously stored. The backup system stores each data chunk with a unique signature value sequentially in a first data backup of the first version of data.

The backup system initiates an incremental data backup of the source system subsequent to create the first data backup. At 204, the backup system receives a second version of data from the source system. The receiving module receives the second version of data as second sequential byte stream from the source system's storage subsystem 116.

The backup system detects changes within the byte stream in reference to previous first data backup by identifying modified byte sequences to provide incremental backup functionality. At 206, the backup system determines differences between the first data backup and the second version of the data. The backup system processes the byte stream to identify differences between the source system storage subsystem 116 and the data stored in the first data backup. The byte stream is partitioned into a plurality of data chunks. A data chunk signature, hash, is generated for each data chunk. The backup system checks the hash table for the existence of each hash. The source system storage subsystem 116 has at least one change if a data chunk signature is not stored in the hash table.

The backup system includes reconstruction metadata in a second data backup to reference data chunks stored in the first data backup. At 208, the creation module references each portion of the second version of data that is the same as a portion of the first data backup in the second data backup. The reconstruction metadata describes how to assemble the data chunks into the original data. The reconstruction metadata uses the data structure to identify a location of a data chunk stored in the first data backup with data chunk offset-lengths. The data chunk offset-lengths provide the location of each previously stored data chunk in the first data backup. The reconstruction metadata is represented using offset-length tuples (e.g. {offset, length}) in the second data backup, according to an embodiment of the invention.

A sequence of data chunks can be represented by one offset-length tuple by merging adjacent tuples. If a sequence of chunks from the first version of data on a source system is unique, then it is being stored as the same sequence into the first data backup, requiring only one {offset, length} tuple. Sub-sequences can be matched within the sequence of chunks because all individual segments are tracked during compression. Therefore, the only metadata that is required is the path and filename for each file in the archive, along with file-specific information such as ctime, mtime, etc., and a list of {offset, length} tuples to reconstruct the constituent files.

The backup system stores the incremental data backup of the source system's storage repository 116. At 210, the backup system includes each portion of the second version of data that is different than all portions of the first data backup in the second data backup. At 212, the second data backup is appended to the first data backup to create the incremental data backup.

The data backup is created in segments. A segment remains in memory until it is completely prepared, and is then streamed out which allows random updates within the segment (such as to the segment length) without the need to seek on disk. The segment size is 8 MB, according to the one embodiment. File data can span segments, but each new file to the archive begins a new segment. Reconstruction metadata references in a given segment are relative to the beginning of the segment in which they are located. The reconstruction metadata references refer either to chunks in the same segment (positive values), or to chunks in a previous segment (negative values), but never to chunks in a future segment to provide for appendability of data backups to concatenate two data backups to form one incremental data backup.

Figure 3A:
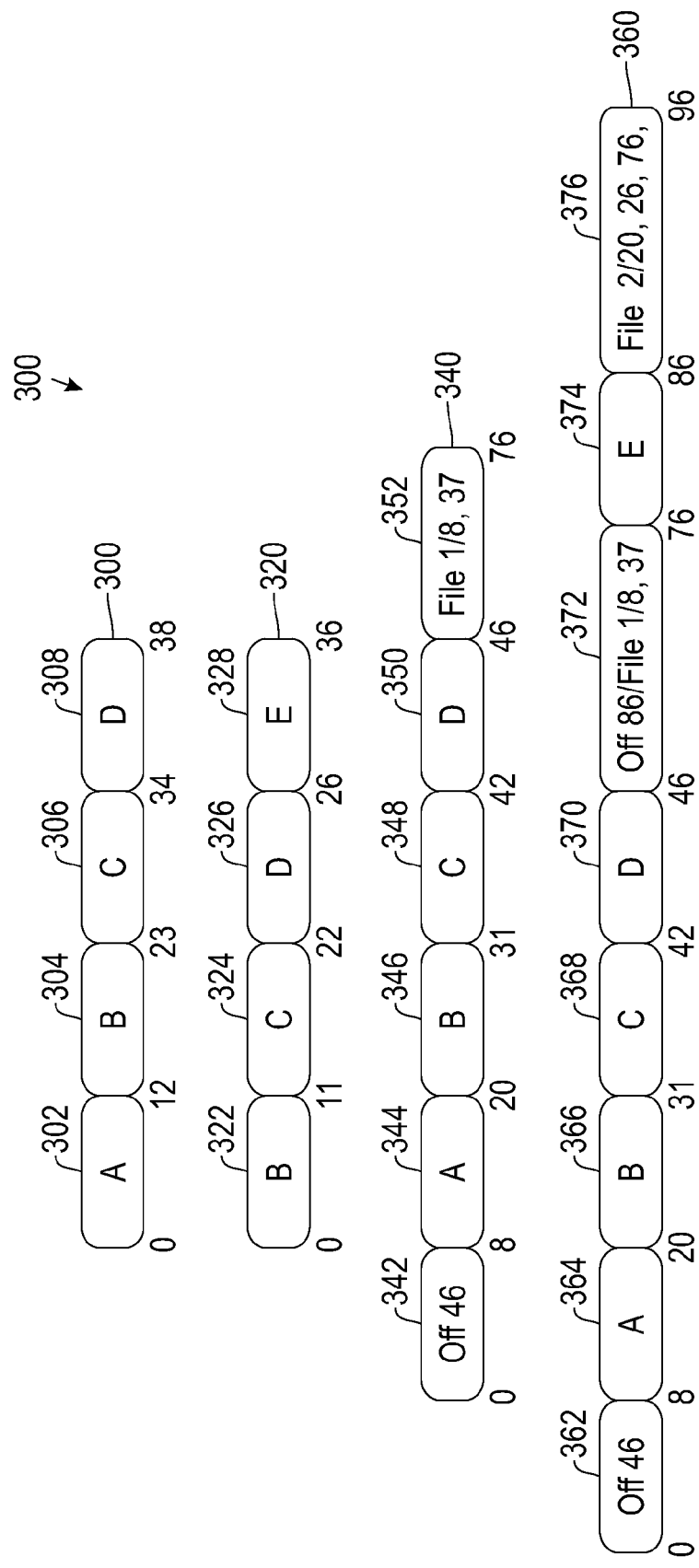
FIG. 3A illustrates an appended data backup with reconstruction metadata, according to one embodiment.

FIG. 3A illustrates an exemplary incremental data backup. The incremental data backup includes reconstruction metadata, which references previously stored data chunks in the first data backup. A first sequential byte stream 300 is partitioned into four data chunks, data chunk A 302, data chunk B 304, data chunk C 306, and data chunk D 308. Data chunk A 302 has a boundary at offset 12, data chunk B 304 has a boundary at offset 23, data chunk C 306 has a boundary at offset 34, and data chunk D 208 has a boundary at offset 38.

A first data backup 340 is a full backup and includes a header 342 which provides for the location of the reconstruction metadata in the data archive. The header 342 provides that the reconstruction metadata is located at offset 46. The first data backup includes new data chunks from the first sequential byte stream, data chunk A 344, data chunk B 346, data chunk C 348, and data chunk D 350. The reconstruction metadata 352 provides that the first sequential byte stream can be reassembled by combining data chunks in sequence from offset 8 to offset 37, which includes data chunk A 344, data chunk B 346, data chunk C 348, and data chunk D 350.

A second sequential byte stream 320 is partitioned into four data chunks, data chunk B 322, data chunk C 324, data chunk D 326, and data chunk E 328. Data chunk B 322 has a boundary at offset 11, data chunk C 324 has a boundary at offset 22, data chunk D 326 has a boundary at offset 26, and data chunk E 328 has a boundary at offset 36.

An incremental data backup 360 includes a second data backup appended to the first data backup 340. The header 362 provides for the location of the reconstruction metadata in the data archive. Header 362 provides that the reconstruction metadata is located at offset 46. The incremental data backup 360 includes previously stored data chunks data chunk A 364, data chunk B 366, data chunk C 368, and data chunk D 370. The reconstruction metadata 372 at offset 46 provides that the first sequential byte stream can be reassembled by combining data chunks in sequence from offset 8 to offset 37. The reconstruction metadata 372 also provides the location of the appended reconstruction metadata 376 at offset 86.

The new data chunk E 374 from the second sequential byte stream 320 is appended to the first data backup 340 to create the incremental data backup 360. The reconstruction metadata 376 provides that the second sequential byte stream can be reassembled by combining data chunks beginning at offset 20 with a sequence length of 26 which includes data chunk B 366, data chunk C 368, and data chunk D 42 combined with data chunk E 374 beginning at offset 76 with a sequence length of 10.

FIG. 3B illustrates a data structure 380 for referencing previously stored data chunks and for storing data chunk signatures. The data structure 380 stores hash values 382, 386, 390, 394, and 398 and data chunk offset-lengths 384, 388, 392, 396, and 399. Hash 0xAF 382 represents a data chunk A located at offset 8 with a length of 12 in the incremental data backup. Hash 0x20 382 represents a data chunk B located at offset 20 with a length of 11 in the incremental data backup. Hash 0xB2 390 represents a data chunk C located at offset 31 with a length of 11 in the incremental data backup. Hash 0x48 394 represents a data chunk D located at offset 42 with a length of 4 in the incremental data backup. Hash 0x79 398 represents a data chunk E located at offset 76 with a length of 10 in the incremental data backup.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a wide area network WAN, or the connection may be made to an external computer (for example, through the Internet using an Internet Service Provider).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
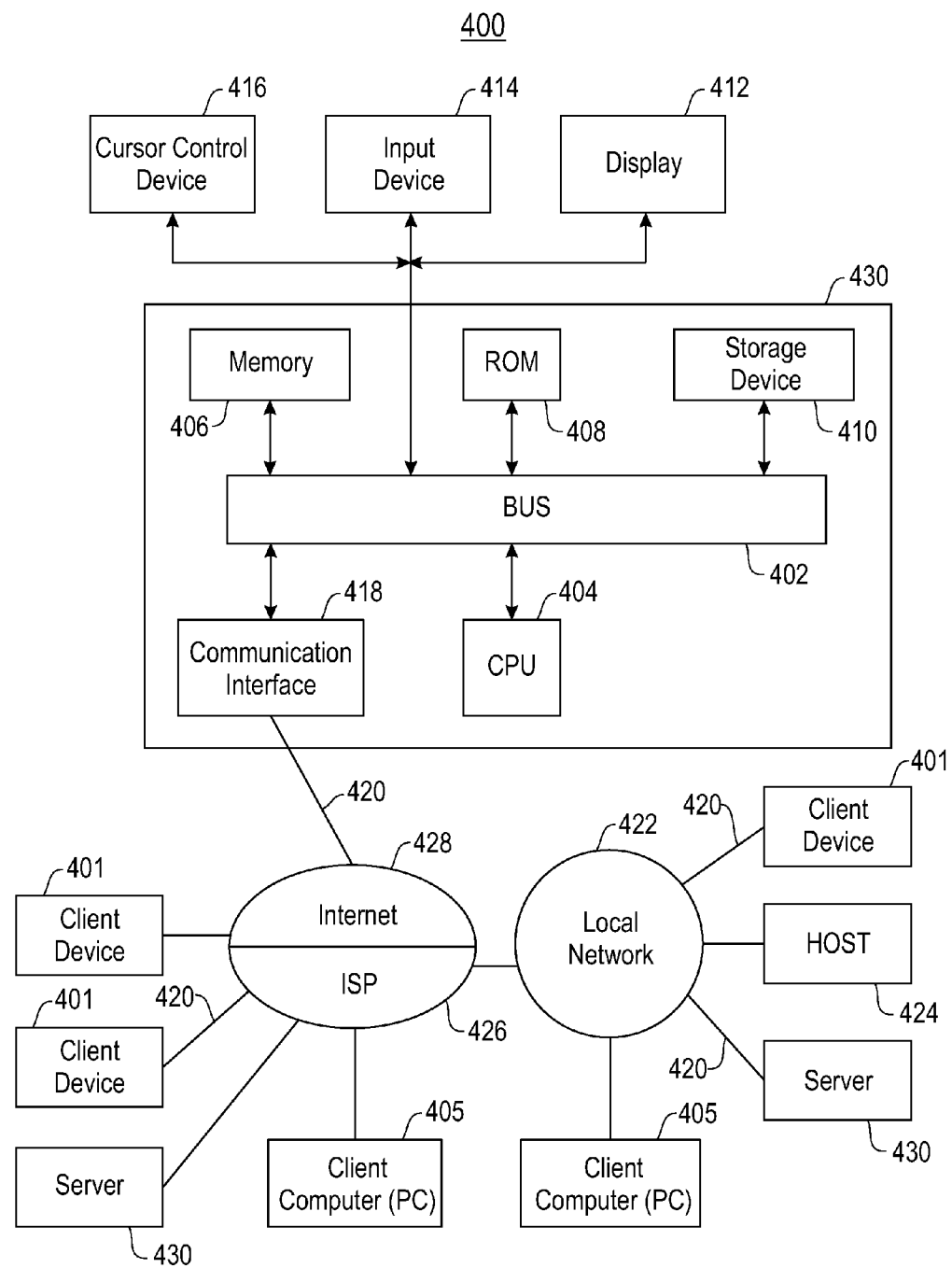
FIG. 4 illustrates a block diagram of a system in which a process for creating an operating system and file system independent incremental data backup may be implemented, according to one embodiment.

FIG. 4 illustrates a block diagram of a exemplary system in which a process for creating an operating system and file system independent incremental data backup may be implemented, according to one embodiment. The system 400 includes one or more client devices 401 connected to one or more server computing systems 430. A server 430 includes a bus 402 or other communication mechanisms for communicating information, and a processor (CPU) 404 coupled with the bus 402 for processing information. The server 430 also includes a main memory 406, such as a random access memory (RAM) or other dynamic storage device, coupled to the bus 402 for storing information and instructions to be executed by the processor 404. The main memory 406 also may be used for storing temporary variables or other intermediate information during execution or instructions to be executed by the processor 404.

The server computer system 430 further includes a read only memory (ROM) 408 or other static storage device coupled to the bus 402 for storing static information and instructions for the processor 404. A storage device 410, such as a magnetic disk or optical disk, is provided and coupled to the bus 402 for storing information and instructions. The bus 402 may contain, for example, thirty-two address lines for addressing video memory or main memory 406. The bus 402 can also include, for example, a 32-bit data bus for transferring data between and among the components, such as the CPU 404, the main memory 406, video memory and the storage 410. Alternatively, multiplex data/address lines may be used instead of separate data and address lines.

The server 430 may be coupled via the bus 402 to a display 412 for displaying information to a computer user. An input device 414, including alphanumeric and other keys, is coupled to the bus 402 for communicating information and command selections to the processor 404. Another type of user input device comprises cursor control 416, such as a mouse, a trackball, or cursor direction keys for communicating direction information and command selections to the processor 104 and for controlling cursor movement on the display 412.

The functions of the invention are performed by the server 430 in response to the processor 404 executing one or more sequences of one or more instructions contained in the main memory 406. Such instructions may be read into the main memory 406 from another computer-readable medium, such as the storage device 410. Execution of the sequences of instructions contained in the main memory 406 causes the processor 404 to perform the process steps described herein. One or more processors in a multi-processing arrangement may also be employed to execute the sequences of instructions contained in the main memory 406. In alternative embodiments, hard-wired circuitry may be used in place of or in combination with software instructions to implement the invention. Thus, embodiments of the invention are not limited to any specific combination of hardware circuitry and software.

Various forms of computer readable media may be involved in carrying one or more sequences of one or more instructions to the processor 404 for execution. For example, the instructions may initially be carried on a magnetic disk of a remote computer. The remote computer can load the instructions into its dynamic memory and send the instructions over a telephone line using a modem. A modem local to the server 430 can receive the data on the telephone line and use an infrared transmitter to convert the data to an infrared signal. An infrared detector coupled to the bus 402 can receive the data carried in the infrared signal and place the data on the bus 402. The bus 402 carries the data to the main memory 406, from which the processor 404 retrieves and executes the instructions. The instructions received from the main memory 406 may optionally be stored on the storage device 410 either before or after execution by the processor 404.

The server 430 also includes a communication interface 418 coupled to the bus 402. The communication interface 418 provides a two-way data communication coupling to a network link 420 that is connected to the world wide packet data communication network now commonly referred to as the Internet 428. The Internet 428 uses electrical, electromagnetic or optical signals that carry digital data streams. The signals through the various networks and the signals on the network link 420 and through the communication interface 418, which carry the digital data to and from the server 430, are exemplary forms or carrier waves transporting the information.

In another embodiment of the server 430, interface 418 is connected to a network 422 via a communication link 420. For example, the communication interface 418 may be an integrated services digital network (ISDN) card or a modem to provide a data communication connection to a corresponding type of telephone line, which can comprise part of the network link 420. As another example, the communication interface 418 may be a local area network (LAN) card to provide a data communication connection to a compatible LAN. Wireless links may also be implemented. In any such implementation, the communication interface 418 sends and receives electrical electromagnetic or optical signals that carry digital data streams representing various types of information.

The network link 420 typically provides data communication through one or more networks to other data devices. For example, the network link 420 may provide a connection through the local network 422 to a host computer 424 or to data equipment operated by an Internet Service Provider (ISP) 426. The ISP 426 in turn provides data communication services through the Internet 428. The local network 422 and the Internet 428 both use electrical, electromagnetic or optical signals that carry digital data streams. The signals through the various networks and the signals on the network link 120 and through the communication interface 418, which carry the digital data to and from the server 430, are exemplary forms or carrier waves transporting the information.

The server 430 can send/receive messages and data, including e-mail, program code, through the network, the network link 420 and the communication interface 418. Further, the communication interface 418 can comprise of a USB/Tuner and the network link 420 may be an antenna or cable for connecting the server 430 to a cable provider, satellite provider or other terrestrial transmission system for receiving messages, data and program code from another source.

The example versions of the invention described herein may be implemented as logical operations in a distributed processing system such as the system 400 including the servers 430. The logical operations of the present invention can be implemented as a sequence of steps executing in the server 430, and, as interconnected machine modules, within the system 400. The implementation is a matter of choice and can depend on performance of the system 400 implementing the invention. As such, the logical operations constituting said example versions of the invention are referred to for e.g. as operations, steps or modules.

Similar to a server 430 described above, a client device 401 can include a processor, memory, storage device, display, input device and communication interface (e.g., e-mail interface) for connecting the client device to the Internet 428, the ISP 426, or LAN 422, for communication with the servers 430.

The system 400 can further include computers (e.g., personal computers, computing nodes) 405 operating the same manner as client devices 401, wherein a user can utilize one or more computers 405 to manage data in the server 430.

Generally, the term "computer-readable medium", as used herein, refers to any medium that participated in providing instructions to the processor 404 for execution. Such a medium may take many forms, including but not limited to, non-volatile media, volatile media and transmission media. Non-volatile media includes, for example, optical or magnetic disks, such as the storage device 410. Volatile media includes dynamic memory, such as the main memory 406. Transmission media includes coaxial cables, copper wire and fiber optics, including the wires that comprise the bus 402. Transmission media can also take the form of acoustic or light waves, such as those generated during radio wave and infrared data communications.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of creating an operating system and file system independent incremental data backup, comprising:
    receiving a first data backup of a source system, the first data backup being a byte-level data backup of the source system's storage;
    receiving a second version of the source system's data as a byte stream, the second version being a verbatim binary copy of the source system's storage and received independent of the source system's file system and operating system;
    partitioning said second version using a chunking method selected from the group consisting of: content-agnostic chunking, content-aware chunking, and fixed-size chunking;
    creating a second data backup of the second version of the data, comprising:
        determining differences between the first data backup and the second version of the data,
        for a portion at a first position of the second version of the data that is the same as a portion of the first data backup, referencing the portion of the first data backup in the second data backup,
        for a portion at a first position of the second version of the data that is different than all portions of the first data backup, including the portion of the second version of the data in the second data backup, and
        creating reconstruction metadata for assembling an incremental data backup, of the first data backup, into a replication of the second version of the data; and
    appending the second data backup to the first data backup, the appending creates a data backup incremental of the first data backup and the second data backup.

2. The method of claim 1, wherein said determining comprises comparing a byte stream of the first data backup to a byte stream of the second version of the data.

3. The method of claim 1, wherein said determining comprises comparing a signature for a potion of the second version of data to signatures for a plurality of portions of the first data backup.

4. The method of claim 1, wherein the byte stream is received without knowledge of the source system's file system and operating system.

5. The method of claim 1, wherein creating an incremental data backup independent of the source system's operating system and file system is done without file-level access to the source system's storage.

6. The method of claim 3, wherein the signatures for comparison are signatures for the current version of the data and signatures for a most recently backed up version of the data.

7. The method of claim 3, wherein:
    the signatures for the portions of the first data backup and the second version of the data are hashes,
    the hashes for the portions of the first data backup are stored in a first hash table, and
    the hashes for the portions of the second version of the data are stored in the first hash table or and a second hash table.

8. The method of claim 3, further comprising:
    creating the first data backup of a first version of the data, wherein creating the first data backup of the first version of the data comprises:
        comparing hashes of portions of the first version of the data to hashes of portions of previously stored data,
        for portions of the first version of the data that have a same hash as portions of the previously stored data, referencing the portions of the first version of the data in the first data backup, and
        for portions of the first version of the data that have a different hash than portions of the previously stored data, storing the portions of the first version of the data in the first data backup.

9. A computer program product of creating an operating system and file system independent incremental data backup, said program product comprising a non-transitory computer readable storage medium having computer usable program code embodied therewith, said program code being readable/executable by a computer to:
    receive a first data backup of a source system, the first data backup being a byte-level data backup of the source system's storage;
    receive a second version of the source system's data as a byte stream, the second version being a verbatim binary copy of the source system's storage and received independent of the source system's file system and operating system;
    partition said second version using a chunking method selected from the group consisting of: content-agnostic chunking, content-aware chunking, and fixed-size chunking;
    create a second data backup of the second version of the data, comprising:
        determine differences between the first data backup and the second version of the data,
        for a portion at a first position of the second version of the data that is the same as a portion of the first data backup, reference the portion of the first data backup in the second data backup,
        for a portion at a first position of the second version of the data that is different than all portions of the first data backup, include the portion of the second version of the data in the second data backup, and
        create reconstruction metadata for assembling an incremental data backup, of the first data backup, into a replication of the second version of the data; and
    append the second data backup to the first data backup, the append creates a data backup incremental of the first data backup and the second data backup.

10. The computer program product of claim 9, wherein said determine comprises comparing a signature for a potion of the second version of data to signatures for a plurality of portions of the first data backup.

11. The computer program product of claim 9, wherein the byte stream is received without knowledge of the source system's file system and operating system.

12. The computer program product of claim 9, wherein creating an incremental data backup independent of the source system's operating system and file system is done without file-level access to the source system's storage.

13. The computer program product of claim 10, wherein:
the signatures for the portions of the first data backup and the second version of the data are hashes,
the hashes for the portions of the first data backup are stored in a first hash table, and
the hashes for the portions of the second version of the data are stored in the first hash table or and a second hash table.

14. The computer program product of claim 10, said program code being further readable/executable by a computer to:
create the first data backup of a first version of the data, including:
compare hashes of portions of the first version of the data to hashes of portions of previously stored data,
for portions of the first version of the data that have a same hash as portions of the previously stored data, reference the portions of the first version of the data in the first data backup, and
for portions of the first version of the data that have a different hash than portions of the previously stored data, store the portions of the first version of the data in the first data backup.

15. A system of creating an operating system and file system independent incremental data backup, comprising:
a memory device for buffering data to be backed up by the system;
a storage device for storing data being backed up by the system;
a processor for executing computer usable program code; and
a computer readable storage medium having computer usable program code embodied therewith, said program code being executable by the processor to:
receive a first data backup of a source system, the first data backup being a byte-level data backup of the source system's storage,
receive a second version of the source system's data as a byte stream, the second version being a verbatim binary copy of the source system's storage and received independent of the source system's file system and operating system,
partition said second version using a chunking method selected from the group consisting of: content-agnostic chunking, content-aware chunking, and fixed-size chunking create a second data backup of the second version of the data, comprising:
determine differences between the first data backup and the second version of the data,
for a portion at a first position of the second version of the data that is the same as a portion of the first data backup, reference the portion of the first data backup in the second data backup,
for a portion at a first position of the second version of the data that is different than all portions of the first data backup, include the portion of the second version of the data in the second data backup, and
create reconstruction metadata for assembling an incremental data backup, of the first data backup, into a replication of the second version of the data; and
append the second data backup to the first data backup, the append creates a data backup incremental of the first data backup and the second data backup.

16. The system of claim 15, wherein said determine comprises comparing a signature for a potion of the second version of data to signatures for a plurality of portions of the first data backup.

17. The system of claim 15, wherein the byte stream is received without knowledge of the source system's file system and operating system.

18. The system of claim 15, wherein creating an incremental data backup independent of the source system's operating system and file system is done without file-level access to the source system's storage.

19. The system of claim 16, wherein said program code is further executable by the processor to create the first data backup of the first version of the data, and said create the first data backup comprises:
compare hashes of portions of the first version of the data to hashes of portions of previously stored data,
for portions of the first version of the data that have a same hash as portions of the previously stored data, reference the portions of the first version of the data in the first data backup, and
for portions of the first version of the data that have a different hash than portions of the previously stored data, store the portions of the first version of the data in the first data backup.

* * * * *